United States Patent [19]

Fourrey et al.

[11] Patent Number: 4,598,947
[45] Date of Patent: Jul. 8, 1986

[54] DEVICE FOR ADJUSTING THE RELATIVE INCLINATION OF TWO ELEMENTS, AND IN PARTICULAR OF THE SEAT BASE AND SEAT BACK OF AN AUTOMOBILE SEAT

[75] Inventors: Francois Fourrey, Montbeliard; Jean-Pierre Barnabe, Valentigney, both of France

[73] Assignee: Cycles Peugeot, Valentigney, France

[21] Appl. No.: 663,784

[22] Filed: Oct. 23, 1984

[30] Foreign Application Priority Data

Mar. 9, 1984 [FR] France ................. 84 03704

[51] Int. Cl.⁴ ............................................. A47C 1/025
[52] U.S. Cl. ..................................... 297/362; 74/804; 297/354
[58] Field of Search ............. 297/362, 354, 361; 74/804, 805, 640

[56] References Cited

U.S. PATENT DOCUMENTS 3,479,088 11/1969 Bonnaud .................. 297/362 X
4,063,776 12/1977 Wahlmann et al. ....... 297/362 X
4,200,333 4/1980 Cremer et al. ................ 297/362

FOREIGN PATENT DOCUMENTS 2615789 10/1976 Fed. Rep. of Germany ...... 297/362
2463698 4/1981 France ................... 297/362
2034923 6/1980 United Kingdom ........... 297/362

Primary Examiner—William E. Lyddane
Assistant Examiner—José V. Chen
Attorney, Agent, or Firm—Sughrue, Mion, Zinn, Macpeak and Seas

[57] ABSTRACT

The device comprises an oval cam 10 and two toothed rings 3, 4 which are coaxial with the cam and have the same diameter but different numbers of teeth, one of the rings being connected to one of the elements to be adjusted while the other ring is connected to the other element, a flexible set of teeth 16 having a number of teeth less than the number of teeth of the rings, and a flexible ring 30. The ring 30 has a smooth surface in facing relation to the cam 10 and a set of teeth 32 on the opposite side of the ring. The ring is urged by the cam 10 into engagement with the flexible set of teeth 16 and the latter is urged toward the teeth of the rings 3, 4.

6 Claims, 4 Drawing Figures

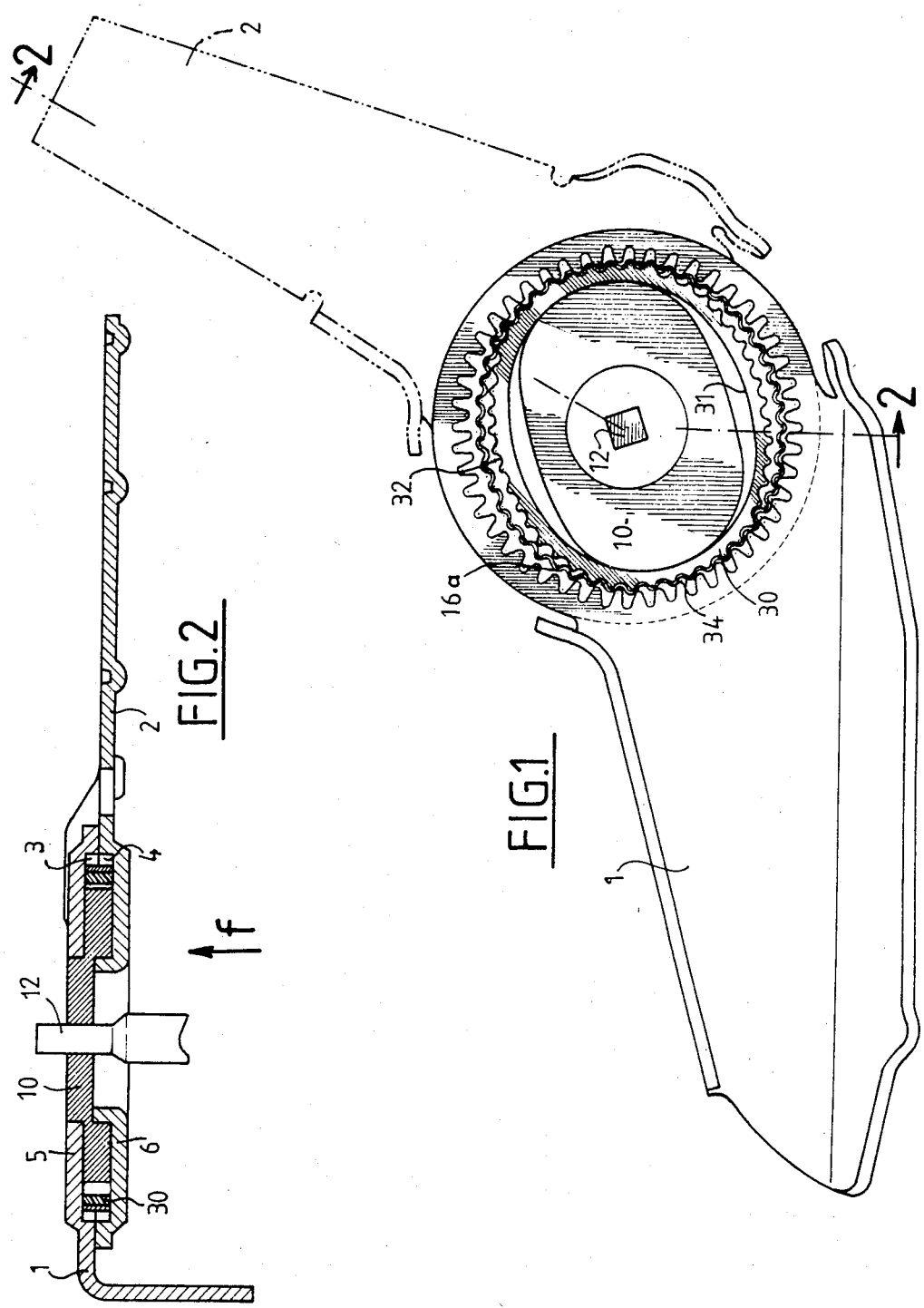

DEVICE FOR ADJUSTING THE RELATIVE INCLINATION OF TWO ELEMENTS, AND IN PARTICULAR OF THE SEAT BASE AND SEAT BACK OF AN AUTOMOBILE SEAT

The present invention relates to the adjustment of the relative inclination of two elements, and more particularly of the inclination of the seat back of an automobile seat relative to the base of this seat.

It concerns a device comprising two toothed rings which have the same inside diameter but a different number of teeth, these rings being each connected to one of the elements and arranged in coaxial relation; an oval cam rotatable about the axis common to the two rings; and a flexible set of teeth formed by an evenly corrugated metal band which is of sufficient width to engage with the two rings and is interposed between the cam and the rings and urged into engagement with the teeth of said rings at two diametrically opposed points, whereby the movable ring and consequently the corresponding element are rotated.

Such a device permits the obtainment of a progressive and continuous drive and can operate in a reliable and prolonged manner. However, the flexible set of teeth and the cam are both made from metal and the metal-to-metal contact of these two members tends to produce disturbing rubbing and obliges the user to apply considerable effort to obtain the desired adjustment.

An object of the present invention is to overcome this drawback and to provide a device in which the metal-to-metal contact of the cam and the flexible set of teeth is eliminated while the engagement of the teeth of the flexible set of teeth and of the rings to be driven is improved.

The invention indeed provides a device which comprises between the cam and the flexible set of teeth a ring of flexible material, such as a plastic material, having a smooth surface in facing relation to the cam and a set of teeth in facing relation to the flexible set of teeth.

According to an embodiment, the ring of flexible material has an even number of teeth which is less than or equal to the number of teeth of the flexible set of teeth.

In such a device, the engagement of the teeth of the flexible set of teeth is achieved by means of the teeth of the ring of plastic material which provides therefore a bearing surface of corresponding shape, while the force exerted by the cam is transmitted through two smooth surfaces in contact with each other. Consequently, the engagement of the teeth of the flexible set of teeth in the toothed rings occurs in a more definite manner in an increased length while the friction is reduced and the force exerted by the cam is transmitted in an effective manner.

The following description of one embodiment, which is given merely by way of a non-limiting example and shown in the accompanying drawing, will bring out the advantages and features of the invention.

In the drawing:

FIG. 1 is a view of a device according to the invention in the direction of arrow 1 of FIG. 2, after the withdrawal of the movable side wall 2 whose position is indicated merely by dot-dash lines;

FIG. 2 is a sectional view taken along line 2—2 of FIG. 1;

Figure 3:
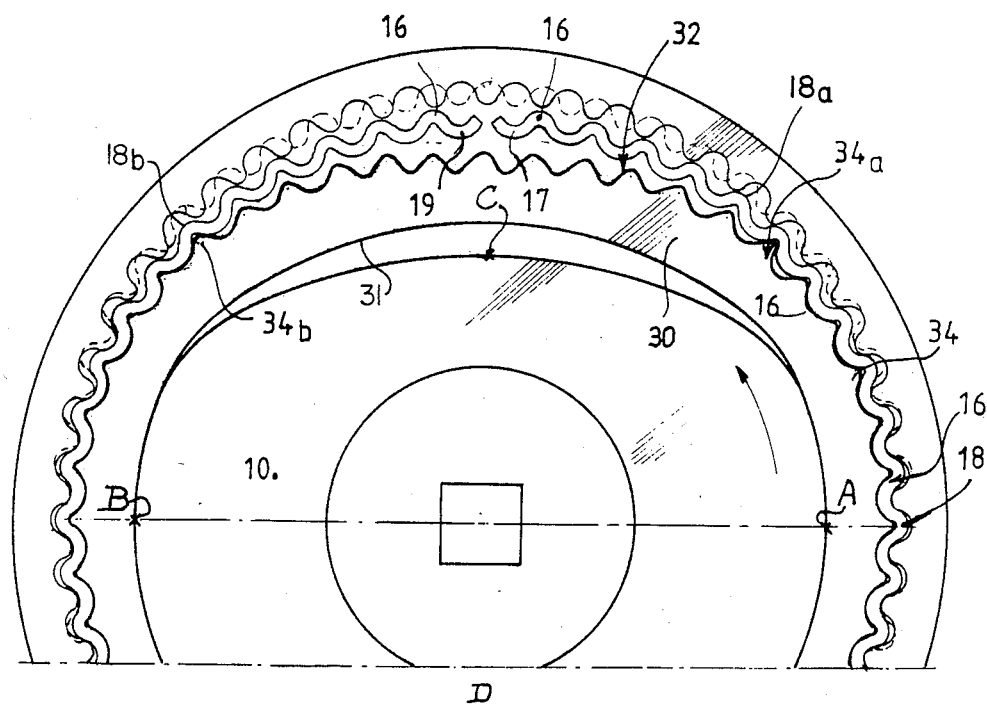
FIG. 3 is a partial diagrammatic view, to an enlarged scale, of the relative positions of the various component parts of the device according to the invention.

The adjusting device shown in the drawings is more particularly for an automobile seat. Consequently, it comprises two side walls, respectively 1 and 2, which will be fixed, one on the seat base which is fixed in position, and the other on the seat back which is movable. Each of the two side walls 1 and 2 has a substantially circular part which is press-formed into a dish shape whose inner surface carries an internally toothed ring respectively 3 and 4. Each of the toothed rings is thus protected by a side portion 5, 6.

The side walls are mounted on each other in such manner that the rings 3 and 4 are coaxial and applied against each other between the side portions 5 and 6. These two rings have the same circumference and teeth of the same depth, although the number of teeth are different. For example, the movable ring 4 has two more teeth than the fixed ring so that the teeth of these two rings are progressively offset with respect to one another between two diametrically opposed points A and B (FIG. 3).

The rings 3 and 4 are centered on a common shaft 12 which is connected to an actuating knob (not shown) and carries an oval cam 10 which is capable of rotating between the side portions 5 and 6.

Figure 4:
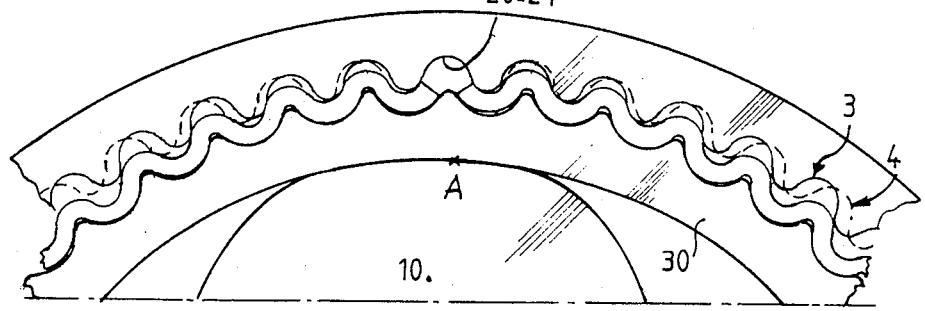
FIG. 4 is a view similar to FIG. 3, to an enlarged scale, of the part of the mechanism corresponding to one end of large diameter of the cam after the latter has been shifted through 90°.

Mounted between the cam 10 and the set of teeth 3 and 4 is a closed ring 30 of a flexible material, preferably a plastics material, which has a smooth surface 31 in facing relation to the cam 10, and a set of teeth 32 on its opposed side. The set of teeth 32 urges, in the direction of the toothed rings 3 and 4, a flexible set of teeth 16 formed by a corrugated metal band which has sufficient width to engage simultaneously with the rings 3 and 4. This band may be welded at its ends so as to form a closed set of teeth, as shown in FIG. 1, or remain open, as shown in FIGS. 3 and 4. In the last-mentioned case, it terminates, at each end, in a corrugation bottom or valley, respectively 17, 19, which has its concavity facing toward the toothed rings, and these two corrugation bottoms are separated by a distance corresponding to a corrugation top or crest, i.e. to a tooth. The open metal band 16 thus forms a number of real teeth 18 which is less than that of the fixed toothed ring 3, the closed metal band has the same number of teeth as this ring. The ring of plastics material 30 has an even number of teeth equal to or less than the theoretical number of the flexible set of teeth. The pitch of the teeth or axially extending corrugations of the metal band is less than the pitch of the teeth of the toothed ring 3, but greater than the pitch of the teeth of the set of teeth 32 of the ring 30.

For example, in one embodiment, the movable toothed ring 4 has fifty teeth, while the fixed ring 3 has only fourty-eight teeth. These rings are engaged with a flexible set of teeth 16 having fourty-eight teeth, i.e. fourty-seven corrugation crests in the case of an open band, it being possible to count the space between the ends as a tooth, and the flexible set of teeth 16, 16a is urged by a ring of plastic material 30, which has fourty-six or fourty-eight teeth.

In such a device, the plastics ring 30 is gripped between the flexible set of teeth 16 and the cam 10 at two diametrically opposed points A and B, corresponding to the ends of large diameter of the cam. In fact, the cam 10 is in close contact with the smooth surface 31 of the ring 30 and urges or biases the latter against the flexible set of teeth 16 so that the teeth 34 of the set of teeth 32 mesh with the teeth 18 of this flexible set of teeth and cause them to enter the teeth 20, 24 of the toothed rings 3 and 4. Thus, at the two points A and B, several teeth 18 of the metal band 16 are engaged with the teeth 20, 24 of the toothed rings 3 and 4. On the other hand, at the ends C of the portion of the cam 10 of small diameter, the resiliently yieldable ring is spaced both from this cam 10 and from the metal band 16, so that the teeth of the latter are free between the ring 30 and the toothed rings 3 and 4.

When the shaft 12 is rotated, the cam 10 slides on the smooth surface 31, for example in the direction of the arrow shown in FIG. 3, and this urges new teeth 34a against the flexible set of teeth and the teeth 18a of the latter in the rings 3 and 4, while other teeth 34b and 18b are disengaged. As the rings have different numbers of teeth, the movable ring 4 is progressively urged back and moves around the shaft 12 which causes the pivoting of the side wall 2 and the seat back of the seat.

Throughout the displacement of the cam 10, the latter is in contact with the plastics material of the ring 30, so that the sliding of these two elements occurs easily. The corrugated metal band 16 is also driven by contact with the plastics material of the ring 30 which easily slides on these teeth.

However, the engaged or active portion of this corrugated metal band is firmly held by the flexible ring 30 which is in close contact both with this corrugated band by its teeth and with the cam by its smooth surface and which thus ensures a well-distributed and practically total transmission of the forces between the cam and the flexible set of teeth and, consequently, between the cam and the movable ring.

A relatively small force exerted on the actuating knob (not shown) is therefore sufficient to cause the rotation of the various elements of the device.

Further, the wear of the parts in contact is relatively low owing not only to the material of these parts, but also to the fact that the flexible set of teeth is supported by that of the ring 30 when it must exert a force on the toothed rings 3 and 4. Thus, it is clear that the device is considerably stronger than prior systems and its life may be distinctly longer.

What is claimed is:

1. A device for adjusting the relative inclination of two elements, and in particular a seat back of an autombile seat relative to a base of the seat, said device comprising two toothed rings which have a common axis and identical inside diameters and different numbers of teeth, one of said rings being connected to one of said elements while the other of said rings is connected to the other of said elements, a cam having a substantially oval shape disposed within said toothed rings and rotatable about said common axis of the rings, and a flexible set of teeth formed by an evenly corrugated metal band which is interposed between the cam and the rings and is capable of being urged into engagement with the teeth of said rings by two diametrically opposed portions of the cam so as to rotate a movable ring of said rings upon rotation of said cam, said device further comprising interposed between the cam and flexible set of teeth a ring of a flexible material which has a smooth surface in facing relation to and in contact with the cam and a set of teeth in facing relation to the corrugated metal band and in releasable engagement with said flexible set of teeth on an inner side of said metal band in the region of said two diametrically opposed portions of the cam.

2. A device according to claim 1, wherein the ring of flexible material has an even number of teeth which is at the most equal to the number of teeth of the flexible set of teeth.

3. A device according to claim 1, wherein the ring is of a plastics material.

4. A device according to claim 1, wherein the teeth of the set of teeth of the flexible ring have a pitch which is less than the pitch of the flexible set of teeth.

5. A device acording to claim 1, wherein the flexible set of teeth is formed by a corrugated band welded at ends of the band.

6. A device according to claim 1, wherein the flexible set of teeth is formed by a corrugated band which terminates in a corrugated hollow at each of the ends of the band.

* * * * *